(12) United States Patent
Moriwaki et al.

(10) Patent No.: US 6,819,328 B1
(45) Date of Patent: Nov. 16, 2004

(54) GRAPHIC ACCELERATOR WITH INTERPOLATE FUNCTION

(75) Inventors: Shohei Moriwaki, Hyogo (JP); Yoshifumi Azekawa, Hyogo (JP); Osamu Chiba, Hyogo (JP); Kazuhiro Shimakawa, Hyogo (JP)

(73) Assignees: Renesas Technology Corp., Tokyo (JP); Mitsubishi Electric System LSI Design Corporation, Hyogo (JP)

( * ) Notice: Subject to any disclaimer, the term of this patent is extended or adjusted under 35 U.S.C. 154(b) by 358 days.

(21) Appl. No.: 09/676,755

(22) Filed: Oct. 2, 2000

(30) Foreign Application Priority Data

Nov. 5, 1999 (JP) .......................................... 11-314804
May 23, 2000 (JP) ....................................... 2000-151400

(51) Int. Cl.[7] .............................................. G09G 5/36
(52) U.S. Cl. ....................................... 345/591; 345/422
(58) Field of Search ................................ 345/501–506, 345/519–520, 522, 530–574, 422, 589, 591, 592, 593, 600, 603–606

(56) References Cited

U.S. PATENT DOCUMENTS

| | | | |
|---|---|---|---|
| 5,786,823 A | | 7/1998 | Madden et al. |
| 5,886,701 A | * | 3/1999 | Chauvin et al. ............ 345/418 |
| 6,016,151 A | * | 1/2000 | Lin ............................. 345/430 |
| 6,104,837 A | * | 8/2000 | Walker ........................ 382/23 |
| 6,115,047 A | * | 9/2000 | Deering ................... 345/422 9 |
| 6,356,306 B1 | * | 3/2002 | Kobayashi .................. 348/322 |
| 6,686,961 B1 | * | 2/2004 | Kubo et al. ................. 348/297 |

FOREIGN PATENT DOCUMENTS

| | | |
|---|---|---|
| JP | 5-22680 | 1/1993 |
| JP | 8-194835 | 7/1996 |
| JP | 10-327422 | 12/1998 |

OTHER PUBLICATIONS

A. Iwainsky, W. Wilhelmi: Lexikon der Computergrafik und Bildverarbeitung, Vieweg, 1994, ISBN 3–528–05342–9, pp. 48, 93 to 98 and 187; HB.

* cited by examiner

Primary Examiner—Kee M. Tung
(74) Attorney, Agent, or Firm—McDermot Will & Emery LLP

(57) ABSTRACT

A graphic accelerator includes an image-forming data decode unit, an image memory control unit and a screen data generation unit. The image memory control unit performs a control for writing an output of the image-forming data decode unit to a frame buffer and reading out information stored in the frame buffer. Screen data generation unit restores (interpolates) the color information based on the data read out from the frame buffer and generates screen data. In the frame buffer the information for each pixel is stored in a deleted form including two types of color information among three types of color information consisting of R, G and B. At the reading, the deleted color information is interpolated with the color information of other pixel.

11 Claims, 16 Drawing Sheets

GRAPHIC ACCELERATOR WITH INTERPOLATE FUNCTION

BACKGROUND OF THE INVENTION

1. Field of the Invention

The present invention relates to a graphic accelerator for performing a high-speed image display.

2. Description of the Background Art

With reference to FIG. 16, image information which has been processed in a conventional two dimensional graphic accelerator will be described. In FIG. 16, RGB (x,y) represents R color information, G color information, and B color information at a pixel location (x, y).

The conventional graphic accelerator thus processes R/G/B color information of a few bit each for each of pixels which are basic units constituting a screen to be displayed. R/G/B color information of each unit pixel are temporarily stored in an external image memory region, read out therefrom and processed as data.

In a 3D graphic accelerator (3D: three dimension) employing Z buffering method, information to be processed includes depth information (Z value) and transparency information ($\alpha$ value) given for each pixel, texture which is pattern data to be pasted on to a polygon and so on in addition to R/G/B color information. Similarly, the information is temporarily stored in an external image memory region, read out therefrom and processed as data.

The size of a screen (the number of pixels) has been increasing recently and the required image memory capacity has also further increased.

In the conventional graphic accelerator, however, when the amount of data to be stored in the image memory increases, the amount of data to be transferred between the graphic accelerator and the image memory increases causing a undesirable effect on the process speed. Particularly in the graphic accelerator capable of processing three dimensional image, as the required image data memory capacity is large and data to be processed is considerable, the improvement in image-forming process performance is hard to achieve.

For the achievement of high-speed processing, the graphic accelerator and the image memory are required to be incorporated in one chip formed on the same semiconductor substrate. The increase in image memory capacity hampers such requirement.

SUMMARY OF THE INVENTION

Hence, the present invention provides a graphic accelerator capable of processing image data at high speed by suppressing the increase in image memory capacity.

A graphic accelerator according to one aspect of the present invention generates display data based on data stored in an image memory and includes; a storage control unit receiving a plurality of pixels each having three types of color information such as RGB, deleting one of three types of color information in each pixel, and storing color information of the plurality of pixels in the image memory such that the color information includes a pixel having two types of color information except first type color information among three types of color information and a pixel having two types of color information except second type color information different from the first type color information among three types of color information; and an interpolation process unit interpolating color information deleted by the storage control unit with a pixel including deleted color information among the plurality of pixels stored in the image memory, for each of the plurality of pixels stored in the image memory. The graphic accelerator supplies display data as an output according to the plurality of pixels stored in the image memory and interpolation result of the interpolation process unit.

According to the graphic accelerator described above, one type of color information among three types of color information is deleted and two types of color information are stored in the image memory for each pixel. Then, deleted color information is interpolated with a pixel which is stored in the image memory and includes deleted color information. Thus, even with a larger screen, information to be stored in the image memory can be reduced. As a result, the amount of data to be transferred between the image memory and the graphic accelerator can be reduced. Hence, more rapid image processing can be achieved. In addition, as the image memory capacity can be decreased, the image memory and the graphic accelerator can be incorporated in a single chip.

Preferably, the storage control unit stores two types of color information except the first type color information among the three types of color information in the image memory for each of the plurality of pixels arranged in a direction of even scan lines, and stores two types of color information except the second type color information among the three types of color information in the image memory for each of the plurality of pixels arranged in a direction of odd scan lines.

According to the above described graphic accelerator, capacity of image memory can be reduced to two-thirds of the capacity of conventional device. In addition, as the process is performed in the direction of scan line, the interpolation process can be readily embodied in a hardware and a compact circuit structure can be achieved.

Preferably, the storage control unit stores two types of color information except the first type color information among the three types of color information in the image memory for each of a first plurality of pixels arranged as a matrix and included in the plurality of pixels, and stores two types of color information except the second type color information among the three types of color information in the image memory for each of a remaining second plurality of pixels included in the plurality of pixels.

According to the above-described graphic accelerator, image memory capacity can be reduced to two-thirds of the capacity of conventional device.

Preferably, the storage control unit divides the plurality of pixels into a plurality of blocks, deletes color information so that the plurality of blocks each include a first type pixel not having the first type color information of the three types of color information and a second type pixel not having the second type color information of the three types of color information, and the interpolation process unit interpolates the deleted color information of a pixel to be interpolated with a pixel having the deleted color information and included in the same block as the pixel to be interpolated.

According to the above-described graphic accelerator, the plurality of pixels are divided into blocks and one of three types of color information is deleted for one pixel and another of three types of color information is deleted for another pixel in each block and the resulting color information is stored in the image memory. Interpolation is performed block-wise. Thus, the image memory capacity can be reduced to two-thirds of the capacity of conventional device.

Preferably, the storage control unit deletes color information such that the plurality of pixels to be output include a first type pixel not having B color information among the three types of color information, a second type pixel not having R color information among the three types of color information, and a third type pixel not having G color information among the three types of color information.

According to the above-described graphic accelerator, R color information is deleted for one pixel, G color information is deleted for another pixel, and B color information is deleted for still another pixel. Thus, image memory capacity can be reduced to two-thirds of the capacity of the conventional device.

Preferably, each of the plurality of pixels written into the image memory includes the same color information. Particularly, each of the plurality of pixels written into the image memory includes G color information.

According to the above-described graphic accelerator, display result similar to an original image can be obtained when G color information is not deleted.

Particularly, the plurality of pixels are arranged in the image memory such that a first line in which all pixels arranged in the scan direction of the screen are the first type pixels, a second line which is next to the first line and in which all pixels arranged in the scan direction of the screen are the second type pixels, and a third line which is next to the second line and in which all pixels arranged in the scan direction of the screen are the third type pixels are repeatedly arranged.

According to the above-described graphic accelerator, first color information is deleted from three types of color information with regard to pixels in (3N+1)th scan lines, second color information is deleted from three types of color information with regard to pixels in (3N+2)th scan lines, and third color information is deleted from three types of color information with regard to (3N+3)th scan lines. Thus, the image memory capacity can be reduced to two-thirds of the conventional device capacity. In addition, as process is performed in the direction of scan line, interpolation process can be readily embodied in a hardware and a compact circuit structure can be obtained.

A graphic accelerator according to another aspect of the present invention generates display data based on data stored in an image memory and includes; a storage control unit receiving a plurality of pixels each having color information and Z value information designating depth, dividing the plurality of pixels into a plurality of blocks, updating shared Z value information and storing the resulting information in the image memory on each block basis, comparing Z value information of a pixel and shared Z value information stored in the image memory on each block basis, and updating color information of the pixel and storing the resulting information in the image memory according to a hidden surface removal process, and a circuit supplying the display data as an output employing the plurality of pixels stored in the image memory.

Preferably, each of the plurality of pixels to be supplied as an input further includes α value information designating transparency. The storage control unit updates shared α0 value information and stores the resulting information in the image memory on each block basis, compares Z value information of the pixel and shared Z value information stored in the image memory, updates color information of the pixel according to the hidden surface removal process and an alpha blending process based on the shared α value stored in the image memory and stores the resulting information in the image memory.

Particularly, the image memory includes a Z buffer storing Z value information shared on each block basis and a frame buffer storing color information of each of the plurality of pixels and α value information shared on each block basis.

According to the above-described graphic accelerator, the plurality of pixels are divided into blocks and each depth information Z and transparency information α are shared by pixels in each block. Thus, the image memory capacity of the Z buffer and the frame buffer can be significantly reduced compared with a conventional approach where depth information Z and transparency information α are stored for every pixel. Hence, more rapid image processing can be achieved. In addition, as the reduction of image memory capacity is allowed, the image memory and the graphic accelerator can be incorporated in a single chip.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
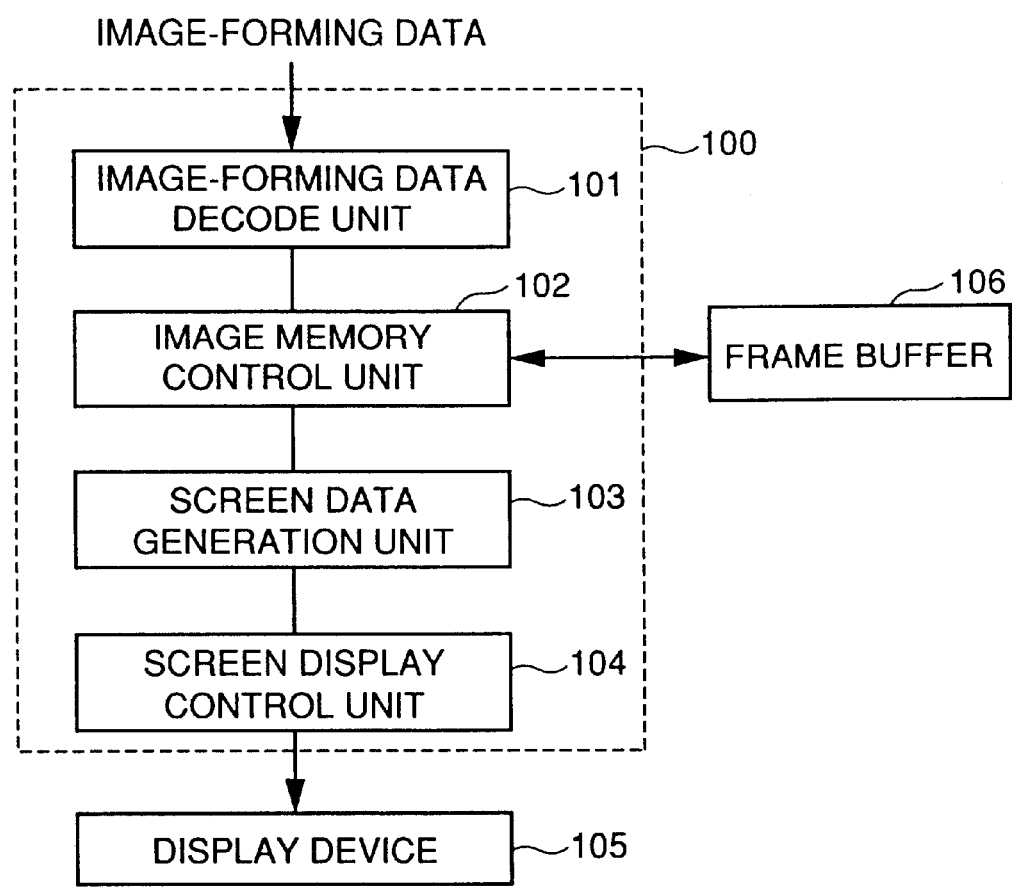
FIG. 1 is a diagram showing an outline of a structure of a graphic accelerator according to the first embodiment of the present invention.

The detailed description of the embodiments of the present invention will be provided hereinbelow with reference to the drawings. In the drawings, the same or a corresponding element will be denoted by the same reference character and the description thereof will not be repeated.

First Embodiment

With reference to FIG. 1, a graphic accelerator according to the first embodiment of the present invention will be described. A graphic accelerator 100 includes a image-forming data decode unit 101, an image memory control unit 102, an screen data generation unit 103 and screen display control unit 104. Graphic accelerator 100 is built in a personal computer, home game tool, or the like, processes image-forming data transmitted from an external CPU or the like and supplies display data as an output to a display device 105.

Image-forming data decode unit 101 receives a command for performing image-forming process (draw the line/draw the rectangle, for example) and decodes image-forming data into an image.

Image memory control unit 102 performs control for writing the output of image-forming data decode unit 101 into a frame buffer 106 and reading out information stored in frame buffer 106.

Screen data generation unit 103 restores (interpolates) color information according to a storing scheme and generates screen data based on data read from frame buffer 106.

Screen display control unit 104 performs processes such as digital-analog conversion on the output from screen data generation unit 103 for display at a corresponding display device 105 and outputs the result to display device 105.

Next, the data storing scheme and the data decoding (interpolating) scheme to/from frame buffer 106 according to the first embodiment of the present invention will be described. Here, the description is given on three types of color information R/G/B constituting a pixel.

Figure 2:
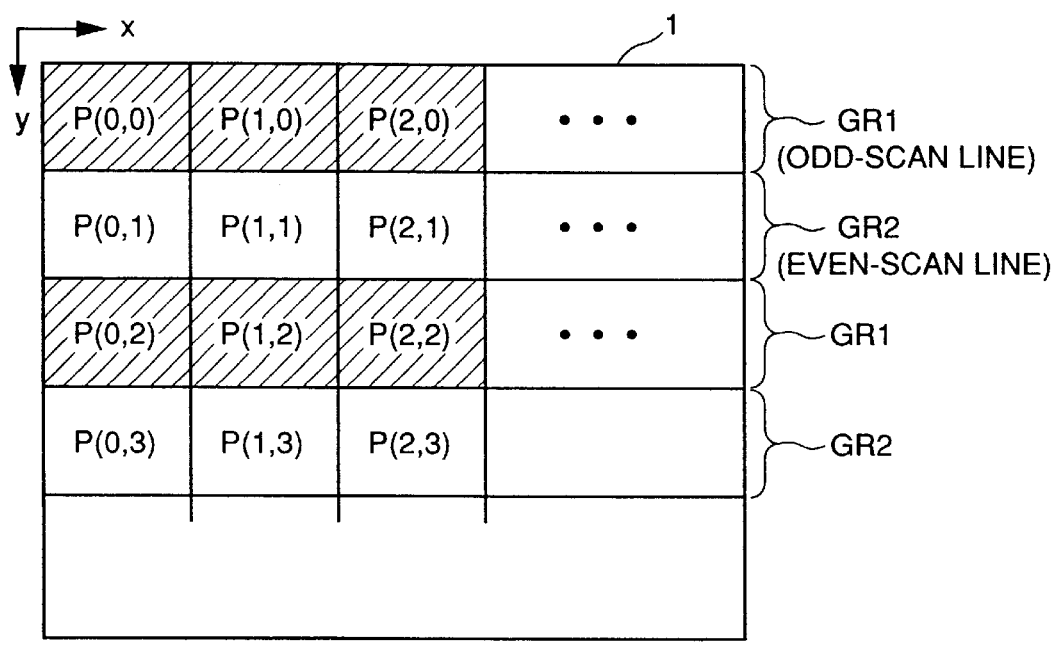
FIG. 2 is a conceptual diagram shown for describing a storing scheme according to the first embodiment of the present invention.

The storing scheme according to the first embodiment of the present invention will be described with reference to FIG. 2. In FIG. 2, character P (x, y) represents a pixel on a coordinate (x, y) in a screen 1. In the first embodiment of the present invention, screen 1 constituted of a plurality of pixels P (x, y) arranged as shown in FIG. 2 are divided into groups of odd scan lines (hatched portion) and even scan lines (non-hatched portion) across the direction of y axis (direction of scan line). Pixels P (0,0), P (1,0), . . . , belong to odd scan line group GR1, whereas pixels P (0,1), P (1,1), . . . , belong to even scan line group GR2.

With reference to FIG. 3, information to be stored into frame buffer 106 for each of these groups is described. In FIGS. 3A to 3F, character F (x, y) represents a storage region in frame buffer 106 associated with pixel P (x, y). Character R (x, y), character G (x, y) and character B (x, y) represent R color information, G color information and B color information of pixel P (x, y), respectively.

Figure 3A:
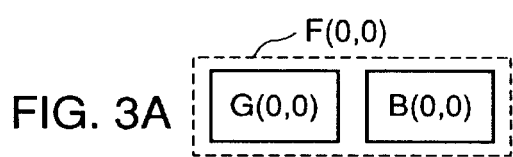
FIGS. 3A to 3F are conceptual diagrams shown for describing information to be stored in a frame buffer 106 according to the first embodiment of the present invention.
Figure 3B:
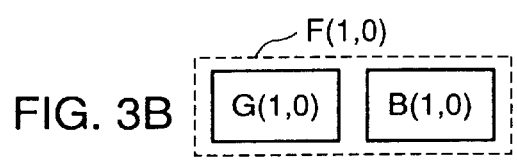
Figure 3C:
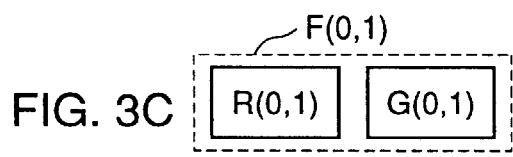
Figure 3D:
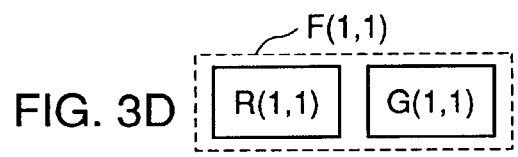
Figure 3E:
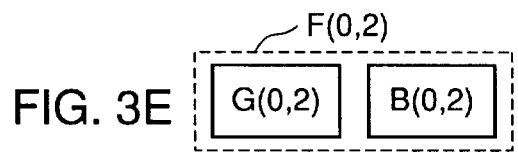
Figure 3F:
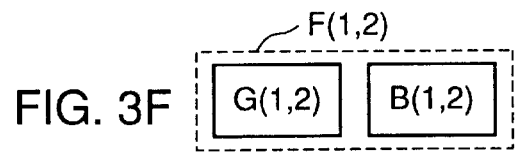

In the first embodiment of the present invention, combination of color information to be stored in frame buffer 106 differs from odd scan lines (FIGS. 3A, 3B, 3E and 3F) to even scan lines (FIGS. 3C and 3D).

For example, from R/G/B color information, G color information and B color information are stored and R color information is not stored with regard to a pixel in an odd scan line. Then, with regard to a pixel in an even scan line, R color information and G color information are stored and B color information is not stored.

Next, data interpolating scheme in screen data generation unit 103 will be described. For the display of image, three types of color information R/G/B are required. Hence, in the first embodiment of the present invention, with regard to a pixel arranged in the odd scan line (even scan line), when corresponding color information is to be read out from the frame buffer, color information that has not been stored is interpolated with color information of a pixel in an adjacent even scan line (odd scan line). Here, color information is shared between the pixel in the odd scan line and the pixel in the even scan line located next to each other.

For example, with regard to pixel P (1, 0) in an odd scan line, G color information G (1, 0) and B color information B (1, 0) have been stored in storage region F (1, 0) of frame buffer 106, while R color information has not been stored. Thus, R color information of an adjacent even scan line, for example, R (1, 1) of pixel P (1, 1) is treated as R color information of the pixel P (1, 0) and used for interpolation. With regard to pixel P (1, 1) in an even scan line, R color information R (1, 1) and G color information G (1, 1) have been stored in storage region F (1, 1) of frame buffer 106, while B color information has not been stored. Thus, B color information of an adjacent odd scan line, for example, B (1, 2) of pixel P (1, 2) is treated as B color information of the pixel P (1, 1) and used for interpolation.

Figure 4:
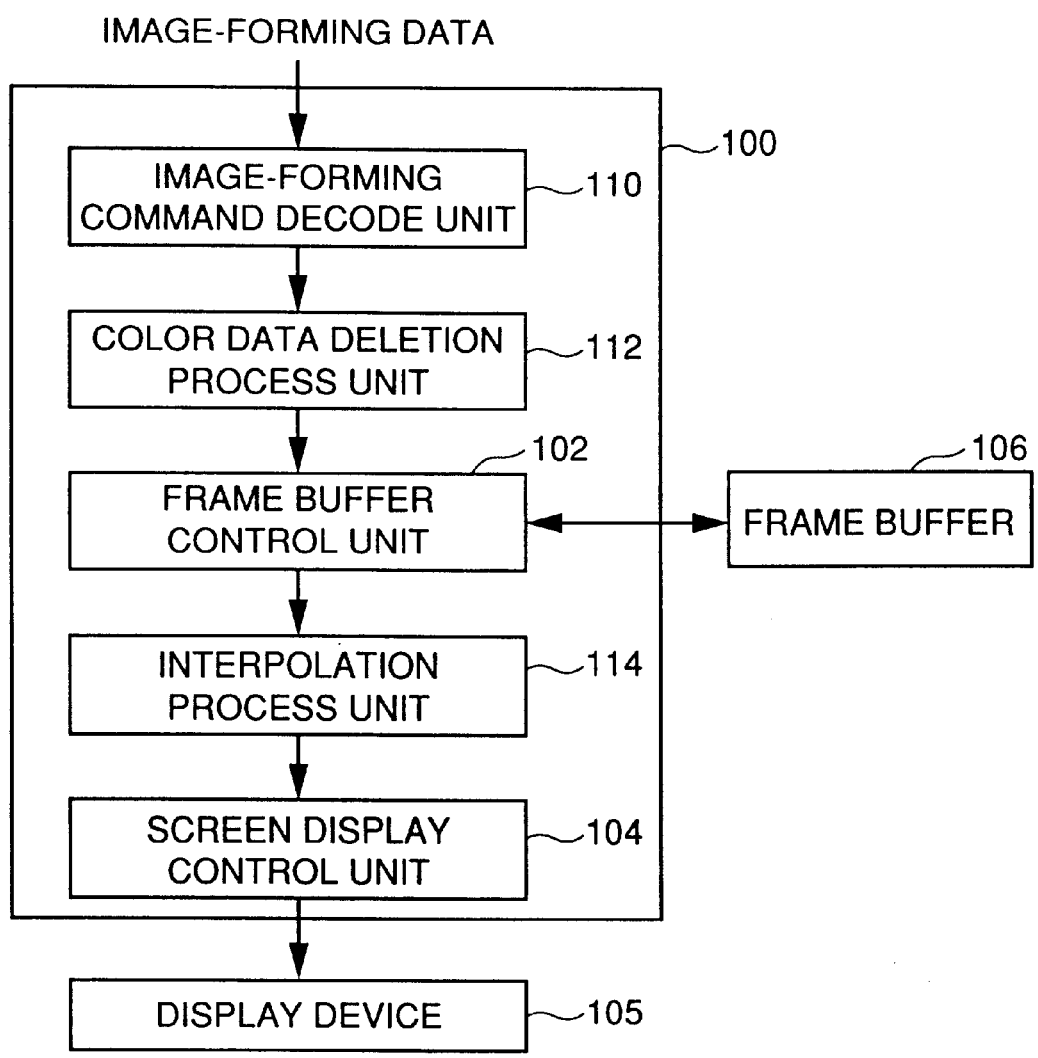
FIG. 4 is a diagram showing a structure of a specific example of graphic accelerator 100.

A specific example of graphic accelerator 100 achieving such an operation will be described with reference to FIG. 4. The graphic accelerator shown in FIG. 4 includes an image-forming command decode process unit 110 receiving image-forming data to decode a command, a color information deletion process unit 112 deleting color information not to be stored in frame buffer 106 from image-forming data according to the storing scheme described above, image memory control unit 102, an interpolation process unit 114 and a screen display control unit 104. Image-forming command decode process unit 110 and color information deletion process unit 112 are included in image-forming data decode unit 101. Interpolation process unit 114 is included in screen data generation unit 103.

Figure 5:
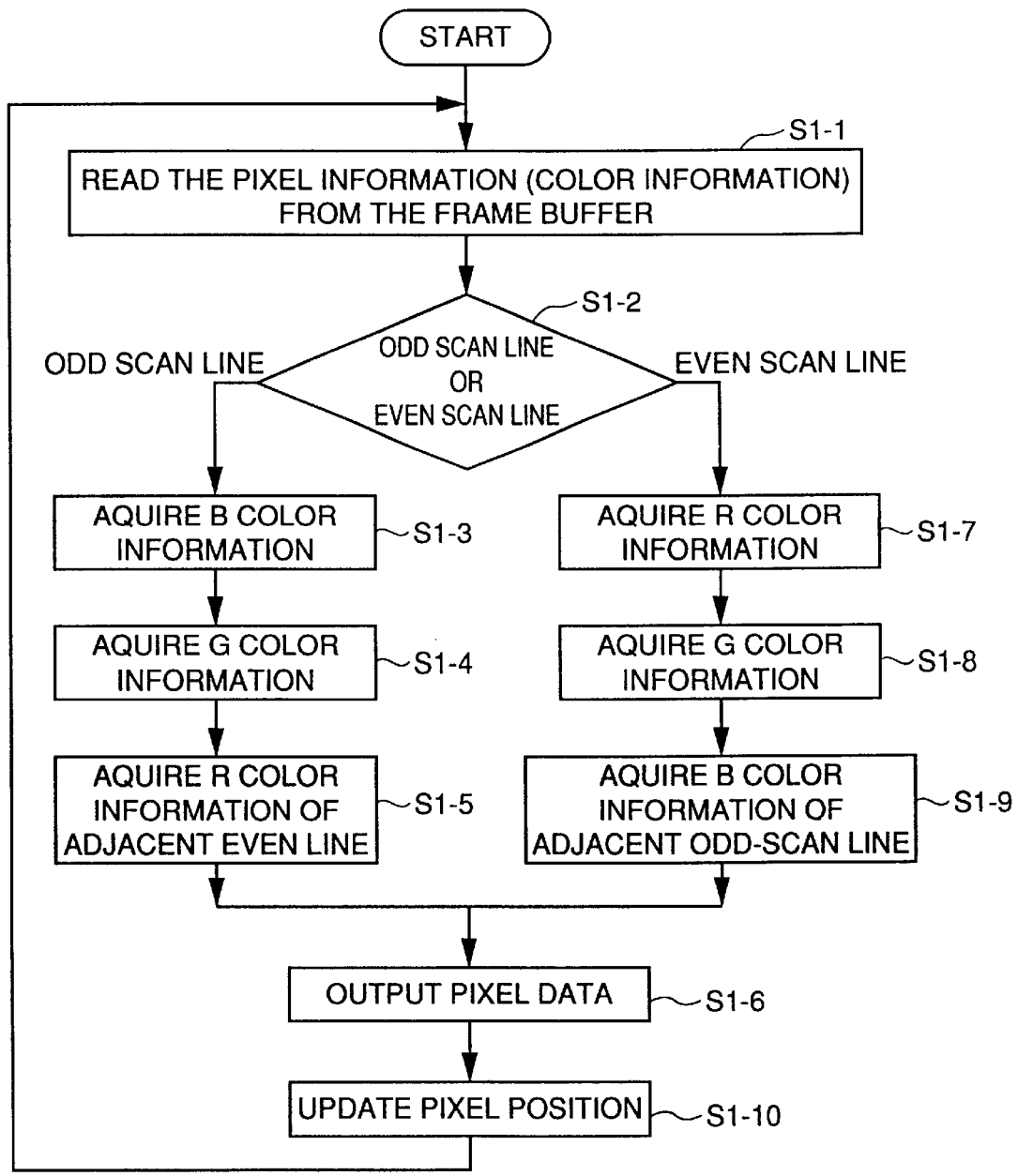
FIG. 5 is a flow chart showing an example of a specific processing procedure in an interpolation process unit 114.

An example of a specific processing procedure in interpolation process unit 114 is shown in FIG. 5. At step S1-1, pixel information (color information) is read out from frame buffer 106. Stored information can be read out along the direction of scan line (raster direction) of display device 105 on which the display is to be shown, or stored information corresponding to two adjacent pixels in longitudinal direction can be read out, or stored information can be read out block by block.

At step S1-2, it is determined whether a pixel to be interpolated is arranged in an odd scan line or in an even scan line. When the pixel is arranged in an odd scan line, the process proceeds to step S1-3 and corresponding B color information (step S1-3) and G color information (step S1-4) are acquired from read-out pixel information. Further, the interpolation is performed with R color information of a pixel in an adjacent even scan line (step S1-5). At step S1-6, acquired R, G, and B color information are output into screen display control unit 104.

When the pixel to be interpolated is determined to be arranged in an even scan line at step S1-2, the process proceeds to step S1-7 and corresponding R color information (step S1-7) and G color information (step S1-8) are acquired from read-out pixel information. Further, the interpolation is performed with B color information of a pixel in an adjacent odd scan line (step S1-9). At step S1-6, acquired R, G, and B color information are output into screen display control unit 104. After the completion of step S1-6, the process proceeds to step S1-10 and the position of the pixel to be interpolated is updated.

Here, stored information of pixel P (1, 1) is used for pixel P (1, 0). In other words, in the case described above, data of an adjacent scan line is employed as it is for the interpolation of color information not stored. The interpolation process is not limited thereto. For example, for the interpolation of B color information of pixel P (1, 1), the interpolation data can be obtained as an average of B color information of adjacent pixels P (0, 0), P (2, 0), P (0, 2), P (2, 2).

The combination of color to be stored in frame buffer 106 is not limited to those described above. Any color information can be deleted.

In addition, when the reproducibility of the color is considered, G color information is not shared by pixels and G color information is stored (in an associated frame buffer) for each pixel.

This is because quality of the display is greatly affected when G color information is shared among pixels. G color information has a big effect on a luminance component (Y component) of displayed color and sight of the human is more sensitive to the change in luminance component than to the color difference information (V information and U information). Expressions (1)–(3) shown below demonstrate the significant effect of G color information on the luminance component of the color. Expressions (1)–(3) are for performing color space conversion from RGB to YUV.

$$Y=0.299R-0.587G+0.114B \quad (1)$$

$$V=Cb=-0.1687R-0.3313G+0.500B \quad (2)$$

$$U=Cr=0.500R-0.4187G-0.0813B \quad (3)$$

In the above expression representing luminance information Y, the factor of the term corresponding to the G component (0.587) is larger than the factor of the R or B component. Thus, it is proved that the G component has a great effect on luminance information.

Thus, G color component is not shared by pixels and R or B component is shared. Thus, the display result will become close to the original image.

According to this process, two kinds of color information are stored in frame buffer 106 for each of all pixels on the screen. Hence, the required capacity of the frame buffer can be reduced to two-thirds of that of the conventional graphic accelerator storing R/G/B color information for each pixel, without significantly degrading the quality of the display. Thus, the amount of data to be transferred to/from frame buffer 106 can be reduced. Hence, still faster data process can be achieved. When frame buffer 106 is connected on the substrate, the number of pins and interconnections can be reduced.

Though in the drawing, frame buffer 106 is arranged in a different region from that of graphic accelerator 100, these can be formed on the same semiconductor substrate.

In addition, though in the above description the graphic accelerator processing the two dimensional image data has been described, a graphic accelerator capable of processing three dimensional image data and processing transparency information α and depth information Z in addition to R/G/B color information can be applied.

Second Embodiment

Figure 6:
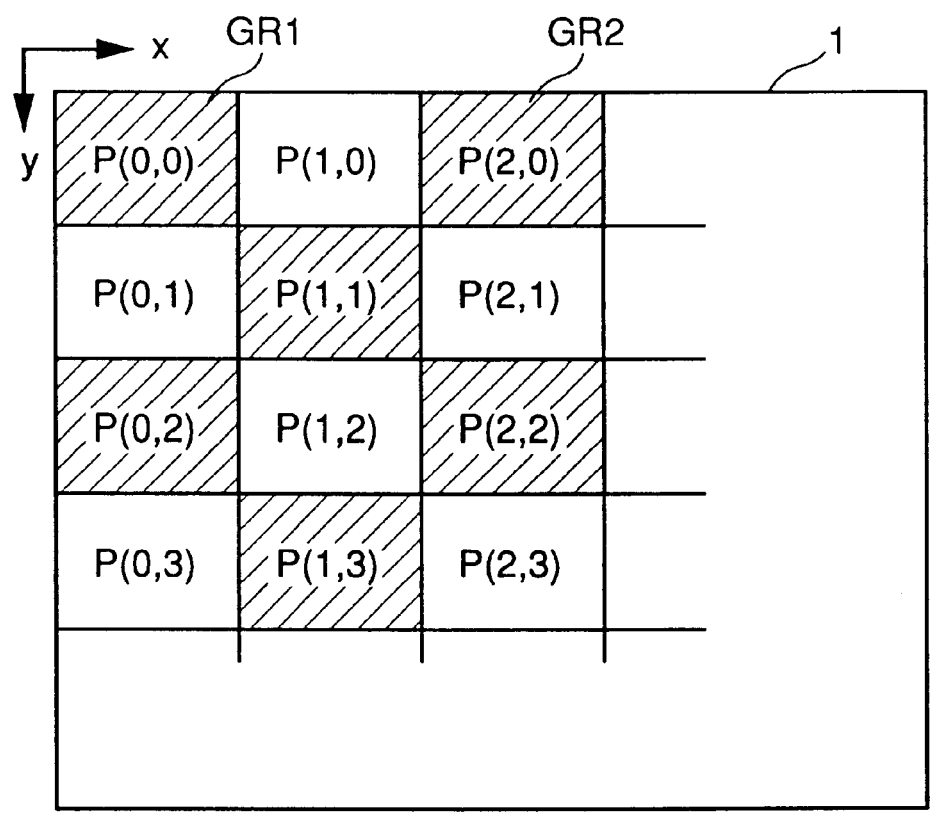
FIG. 6 is a conceptual diagram shown for describing data storing scheme according to the second embodiment of the present invention.
Figure 7A:
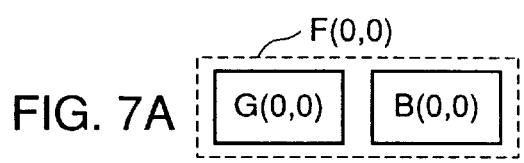
FIGS. 7A to 7F are conceptual diagrams shown for describing information to be stored in a frame buffer 106 according to the second embodiment of the present invention.
Figure 7B:
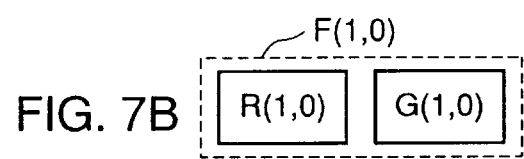
Figure 7C:
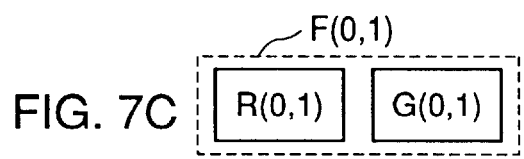
Figure 7D:
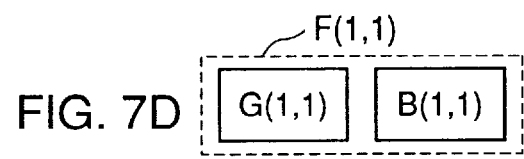
Figure 7E:
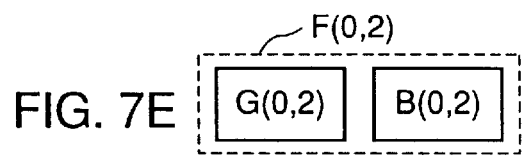
Figure 7F:
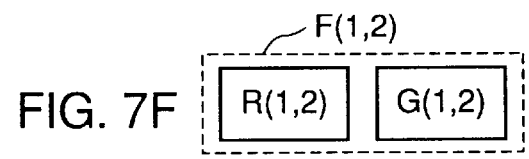

A data storing scheme in a graphic accelerator according to the second embodiment of the present invention will be described. In the second embodiment of the present invention, a matrix-like group division is performed as shown in FIG. 6 (Here, the term "matrix" include a checker). To be specific, pixels adjacent to each other belong to different groups. For example, when pixel (1, 1) belongs to one group GR1 (hatched), pixels P (1, 0), P (0, 1), P (2, 1), and P (1, 2) adjacent to pixel P (1, 1) belong to another group GR2 (non-hatched).

Next, with reference to FIGS. 7A–7F, information stored to frame buffer 106 for each of these groups will be described. In the second embodiment of the present invention, the combination of color information to be stored in frame buffer 106 is changed for every group as shown in FIGS. 7A–7F.

For example, with regard to pixels (P (0, 0), P (1, 1), P (2, 0), . . . ) which belong to group GR1, G color information and B color information among R/G/B color information are stored and R color information is not stored. With regard to pixels (P (0, 1), P (1, 0), P (2, 1), . . . ) which belong to group GR2, R color information and G color information are stored and B color information is not stored.

Next, a data interpolating scheme in screen data generation unit 103 of the second embodiment of the present invention will be described. In the second embodiment of the present invention, with regard to pixels which belong to group GR1 (GR2), color information that has not been stored is interpolated by color information of a pixel which belongs to group GR2 (GR1) when corresponding pixel information is read out from the frame buffer. Here, interpolation of the color information is performed using color information of adjacent pixels.

For example, with regard to pixel P (1, 1) that belongs to group GR1, G color information G (1, 1) and B color information B (1, 1) have been stored in frame buffer 106, whereas R color information has not been stored. Hence, R color information of a pixel that belongs to group GR2, for example, R color information R (1, 0) of pixel P (1, 0) is treated as R color information of pixel P (1, 1) and is used for interpolation.

By replacing the odd scan line and even scan line in the flow chart of FIG. 5 with group G1 and G2, respectively, a specific interpolation process can be shown.

In the example described above, color information of an adjacent pixel in a lateral direction is employed for interpolation of color information not stored. The interpolation process is not limited to this. For example, an average of the color information of the pixels located right and left to the pixel of interest can be used. In this case, the same effect can be obtained.

In addition, an average of B color information (0, 0) of pixel P (0, 0) and B color information B (0, 2) of pixel P (0, 2) can be used for the interpolation of B color information of pixel P (0, 1). In other words, an average of information of adjacent pixels located above and below the pixel of interest can be used. The same effect can be obtained also in this case.

In addition, for the interpolation of R color information of pixel P (1, 1), average of R color information of pixels P (1, 0), P (0, 1), P (1, 2), P (2, 1) can be used. In other words, an average of information of adjacent pixels located above, below, right and left to the pixel of interest can be used. The same effect can be obtained again in this way.

The combination of colors to be stored in frame buffer 106 is not limited to those described above and any color information can be deleted.

Through this process, two kinds of color information are stored in frame buffer 106 for each of all pixels on the screen. Hence, the required capacity of the frame buffer can be reduced to two-thirds of that of the conventional graphic accelerator storing R/G/B color information for each pixel without significantly degrading the quality of the display.

Thus, the amount of data to be transferred to/from frame buffer 106 can be reduced. Thus, still faster data process can be achieved. In addition, frame buffer 106 can be formed in the same semiconductor substrate as one-chip.

In the above description, the graphic accelerator processing two dimensional image data is described. The described process can be applied to a graphic accelerator capable of three-dimensional data processing and processing transparency information α and depth information Z in addition to R/G/B color information.

Third Embodiment

Next, data storing scheme in a graphic accelerator according to the third embodiment of the present invention will be described. In the third embodiment of the present invention, screen 1 is divided into rectangular blocks as shown in FIG. 8 as a unit of the color information sharing.

Figure 8:
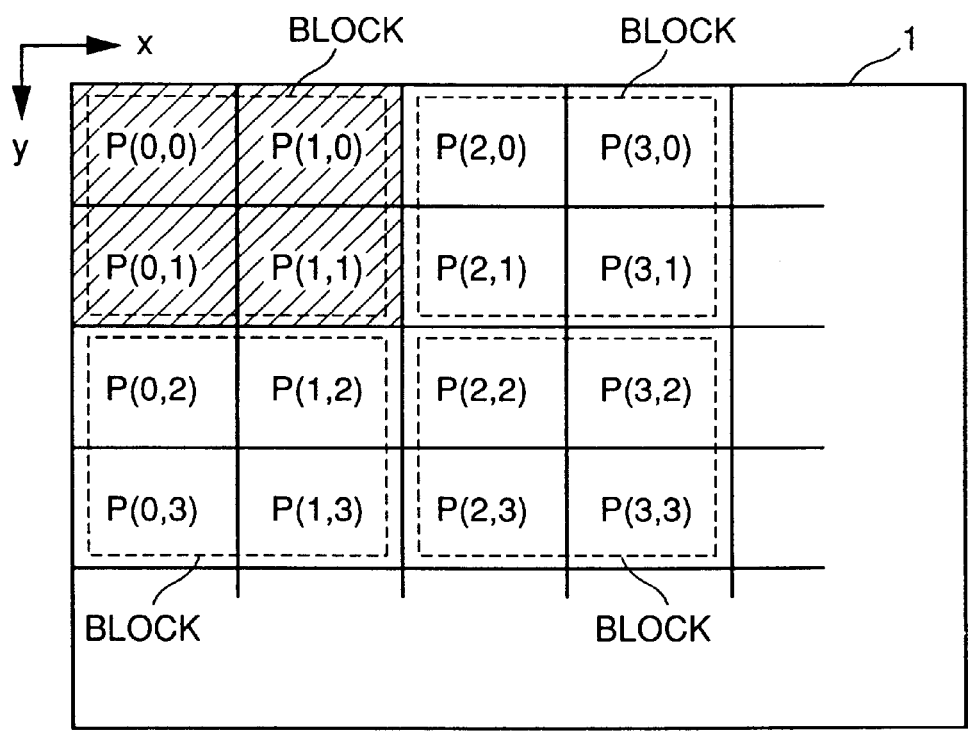
FIG. 8 is a conceptual diagram shown for describing data storing scheme according to the third embodiment of the present invention.
Figure 9:
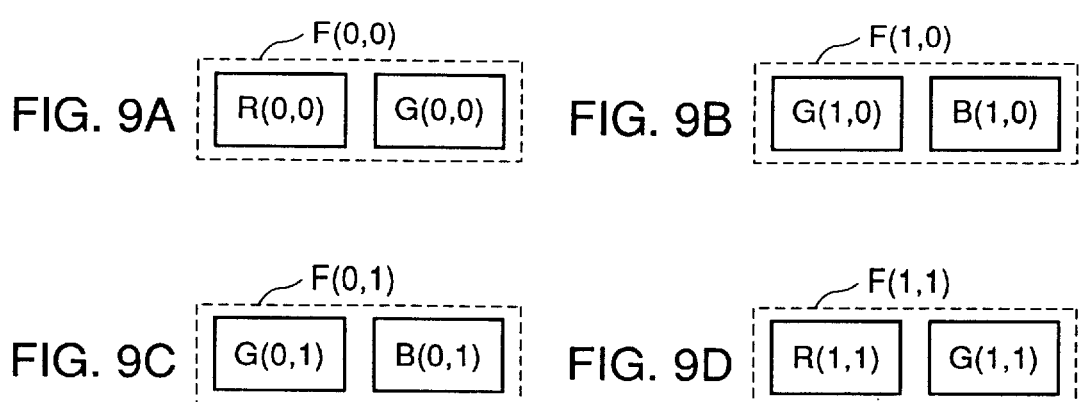
FIGS. 9A to 9D are conceptual diagrams shown for describing information to be stored in frame buffer 106 according to the third embodiment of the present invention.

In FIG. 8, the size of one block is two pixels by two pixels. Pixels P (0, 0), P (1, 0), P (0, 1), P (1, 1) belong to one block and pixels P (2, 0), P (3, 0), P (2, 1), P (3, 1) belong to another block.

With reference to FIGS. 9A to 9D, information to be stored in frame buffer 106 for each of these blocks will be described. In the third embodiment of the present invention, the plurality of pixels in a block are divided into a plurality of groups as shown in FIGS. 9A to 9D and the combination of color information to be stored in frame buffer 106 is changed from group to group.

For example, R color information (0, 0) and G color information (0, 0) are stored for pixel P (0, 0) and R color information R (1, 1) and G color information (1, 1) are stored for pixel P (1, 1) and B color information is excluded from information to be stored (group GR1). On the other hand, G color information G (1, 0) and B color information B (1, 0) are stored for pixel P (1, 0) and G color information G (0, 1) and B color information B (0, 1) are stored for pixel P (0, 1) and R color information is excluded from information to be stored (group GR2).

A data interpolating scheme in screen data generation unit 103 according to the third embodiment of the present invention will be described. In the third embodiment of the present invention, when corresponding pixel information is to be read out from the frame buffer, color information that has not been stored is interpolated by color information of a pixel that belongs to another group in the same block.

An interpolation process for pixels P (0, 0), P (1, 0), P (0, 1), and P (1, 1) that belong to a first block will be described as an example. With regard to pixel P (0, 0), an average value of B color information B (1, 0) of pixel P (1, 0) and B color information B (0, 1) of pixel P (0, 1) is calculated. The average value is considered to be B color information of pixel P (0, 0). The average value can be used also as B color information of pixel P (1, 1).

With regard to pixel P (1, 0), an average value of R color information R (0, 0) of pixel P (0, 0) and R color information R (1, 1) of P (1, 1) is calculated. The average value is considered to be R color information of pixel P (1, 0). The average value can be used also as R color information of pixel P (0, 1).

This is the operation in the block which is the unit of color sharing. The same block definition (rectangle), storage of pixel information and interpolation process of color information are performed on all pixels.

Figure 10:
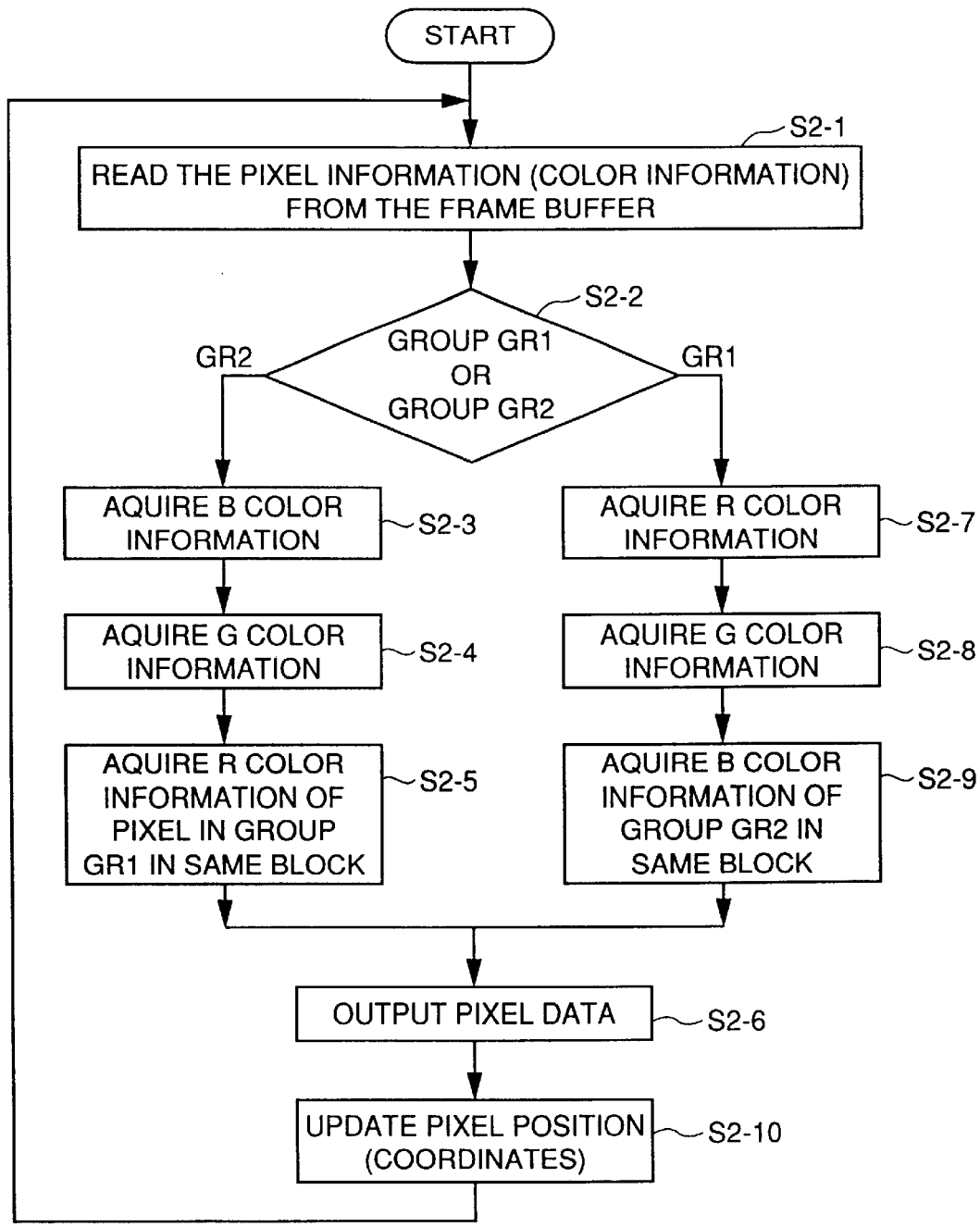
FIG. 10 is a flow chart showing an example of a specific processing procedure in interpolation process unit 114.

An example of a specific process in interpolation process unit 114 is shown in FIG. 10. With reference to FIG. 10, pixel information (color information) is read out from frame buffer 106 at step S2-1. At step S2-2, it is determined whether a pixel to be interpolated belongs to group GR1 or group GR2. When the pixel belongs to group GR2, the process proceeds to step S2-3 and corresponding B color information (step S2-3) and G color information (step S2-4) are acquired from read out pixel information. Further, the interpolation is performed with R color information of a pixel in group GR1 in the same block (step S2-5). At step S2-6, acquired R, G, B color information are output into screen display control unit 104.

When a pixel to be interpolated is determined to belong to group GR1 at step S2-2, the process proceeds to step S2-7 and corresponding R color information (step S2-7) and G color information (step S2-8) are acquired from read out pixel information. Further, the interpolation is performed with B color information of a pixel in group GR2 in the same block (step S2-9). At step S2-6, acquired R, G, B color information are output into screen display control unit 104. After the completion of steps S2-6, the process proceeds to step S2-10 and the position of the pixel to be interpolated is updated.

Through this process, as two kinds of color information are stored for each of all pixels on the screen, the required capacity of frame buffer can be reduced to two-thirds of the conventional graphic accelerator storing R/G/B color information for each pixel without significantly degrading the quality of display.

In the above-described example, the unit of color sharing is two pixels by two pixels. This example is not limiting. The size of the block sharing the color is variable and changeable. In addition, the combination of colors is not limited to the above-described example.

Though the description has been given on the graphic accelerator processing two dimensional image data, the above-described process can be applied to the three dimensional graphic accelerator capable of processing transparency information α and depth information Z in addition to R/G/B color information as well.

Fourth Embodiment

A data storing scheme of a graphic accelerator according to the fourth embodiment of the present invention will be described. In the fourth embodiment of the present invention, screen 1 is divided across the direction of y axis (scan line direction) into a first type group consisting of (3N+1)th lines, a second type group consisting of (3N+2)th lines, and a third type group consisting of (3N+3)th lines (N=0, 1, 2, . . . ).

The same two kinds of color information among three kinds of color information R/G/B constituting the pixel are stored in a corresponding frame buffer for pixels belong to each group. Here, the combination of color information to be stored is made different from group to group.

Figure 11:
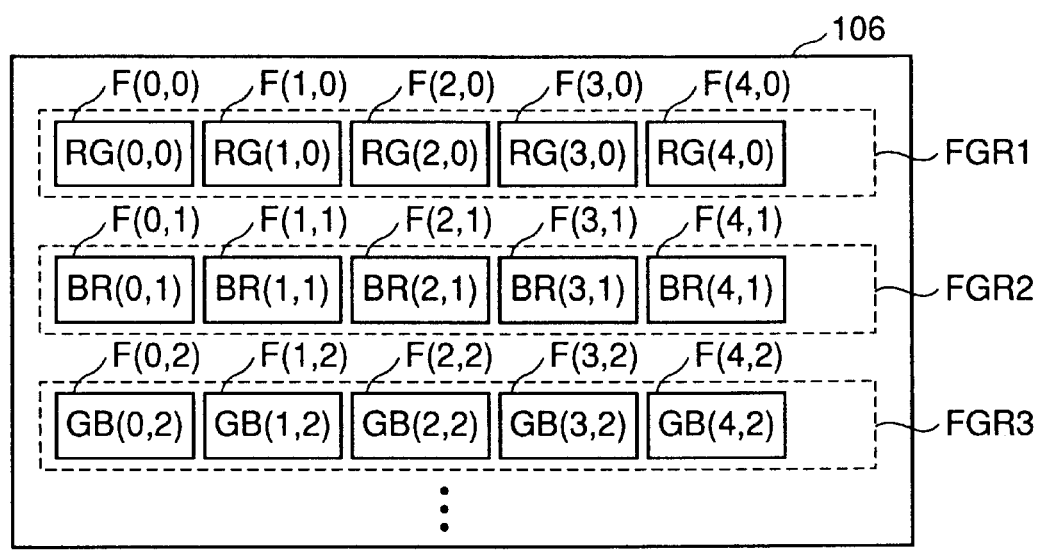
FIG. 11 is a conceptual diagram shown for describing information of pixel information to be stored in frame buffer 106 according to the fourth embodiment of the present invention.

With reference to FIG. 11, a storing scheme of pixel information into the frame buffer according to the fourth embodiment of the present invention will be described. In FIG. 11, FGR1 represents a frame buffer region where pixel information relating to pixels arranged on a first scan line (group GR1) is stored, FGR2 represents a frame buffer region where pixel information relating to pixels arranged on a second scan line (group GR2) is stored, and FGR3 represents a frame buffer region where pixel information relating to pixels arranged on a third scan line (group GR3) is stored.

RG (x, y) represents R/G color information of pixel P (x, y), BR (x, y) represents B/R color information of pixel P (x, y) and GB (x, y) represents G/B color information of pixel P (x, y).

As shown in FIG. 11, with regard to pixels on the first scan line, R/G color information is stored in frame buffer region FGR1 and B color information is excluded from information to be stored. With regard to pixels on the second scan line, B/R color information is stored in frame buffer region FGR2 and G color information is excluded from information to be stored. With regard to pixels on the third scan line, G/B color information is stored in frame buffer region FGR3 and R color information is excluded from information to be stored.

Similarly, with regard to pixels on (3N+1)th scan line (N=1, 2, . . . ), R/G color information is stored and B color information is excluded from the information to be stored. With regard to pixels on (3N+2)th scan line, B/R color information is stored and G color information is excluded from the information to be stored. With regard to pixels on (3N+3)th scan line, G/B color information is stored and R color information is excluded from the information to be stored.

Next, interpolation scheme of data that has not been stored for a pixel at screen data generation unit 103 according to the fourth embodiment of the present invention will be described. Color information that has not been stored is interpolated by color information of a pixel that belongs to another adjacent group and stored in frame buffer 106.

For example, with regard to pixel P (0, 0), interpolation is performed with B color information of pixel P (0, 1) that belongs to group GR2. With regard to pixel P (0, 1), the interpolation is performed with G color information of pixel P (0, 2) belongs to group GR3.

The same process is repeated. Through this process, as two kinds of color information are stored for each of all pixels on the screen, the required capacity of frame buffer can be reduced to two-thirds compared with the conventional graphic accelerator storing R/G/B color information for each pixel.

Here in the fourth embodiment of the present invention, color information is shared and interpolation is performed on scan line basis as in the first embodiment described above. The same effect can be obtained when pixels in the second and third embodiments are divided into groups based on the combination of colors.

In the fourth embodiment of the present invention, though the description is given on the two dimensional graphic accelerator, a three dimensional graphic accelerator processing transparency information α and depth information Z in addition to R/G/B color information can be used.

Fifth Embodiment

The fifth embodiment of the present invention relates to storing scheme and interpolation scheme of image information in a three dimensional graphic accelerator employing the hidden surface removal process and the Z buffering method.

Figure 12:
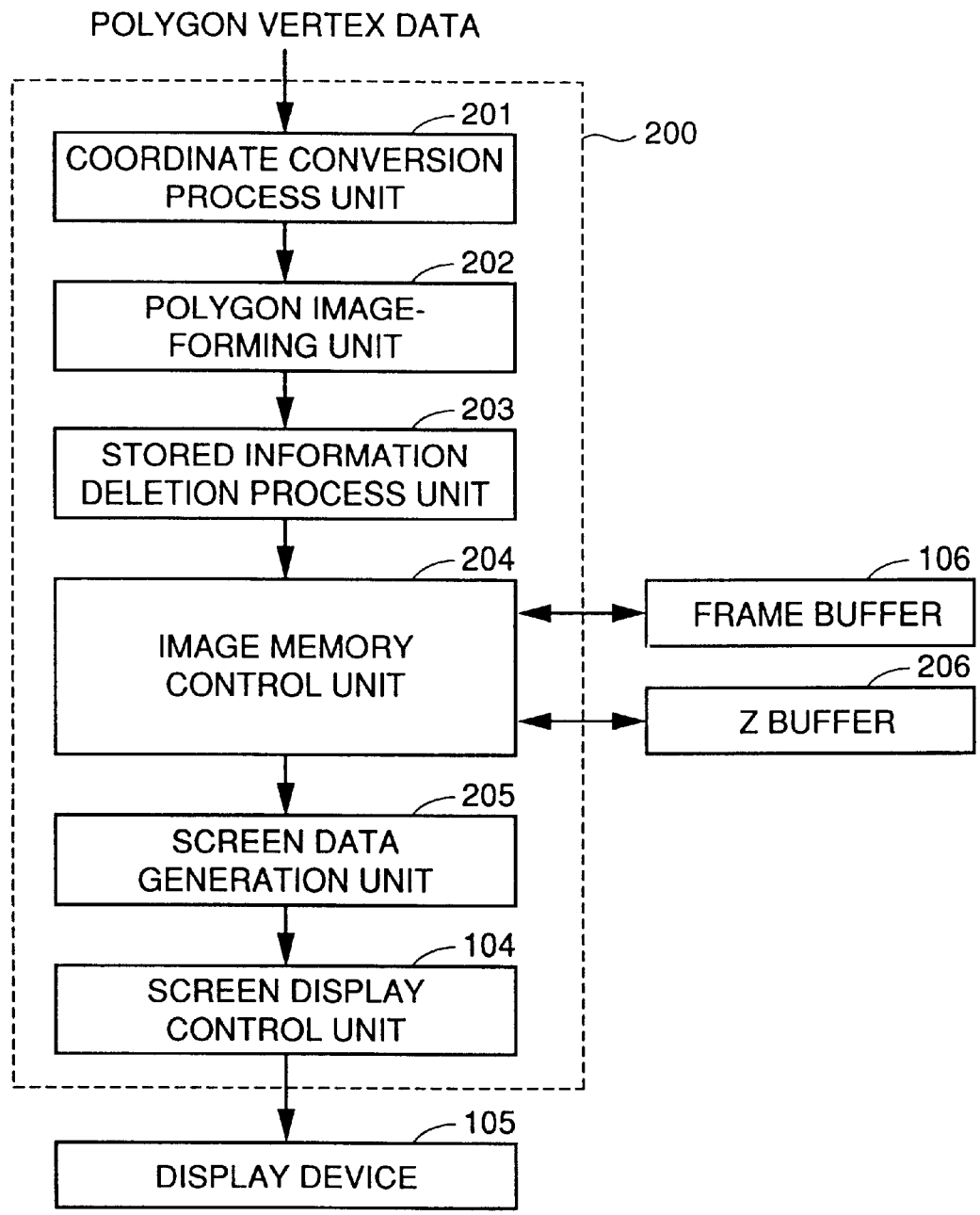
FIG. 12 is a diagram showing a structure of a graphic accelerator 200 according to the fifth embodiment of the present invention.

With reference to FIG. 12, a structure of the three dimensional graphic accelerator based on the Z buffering method according to the present invention will be described. In FIG. 12, a graphic accelerator 200 includes a coordinate conversion process unit 201 performing an geometric operation to convert vertex data of a polygon into a screen coordinate showing a coordinate on the screen and performing light source process, a polygon image-forming unit 202 determining a boundary of the polygon based on the vertex data of the polygon and forming an image of pixels included in the polygon, a storage information deletion process unit 203 deleting α value information representing transparency of the pixel (hereinafter referred to as a transparency information α) and Z value information representing depth information of an object (hereinafter referred to as depth information Z), frame buffer 106 storing R/G/B color information and transparency information α of each pixel, a Z buffer 206 for storing depth information Z of each pixel constituting a screen, an image memory control unit 204 performing a writing operation and a reading operation of frame buffer 106 and Z buffer 206, a screen data generation unit 205 forming screen data based on read out information from frame buffer 106 and Z buffer 206, and screen display control unit 104 performing a control for displaying screen data on display device 105.

Depth information Z is used for the hidden surface removal process and transparency information α is used for alpha blending process.

Figure 13A:
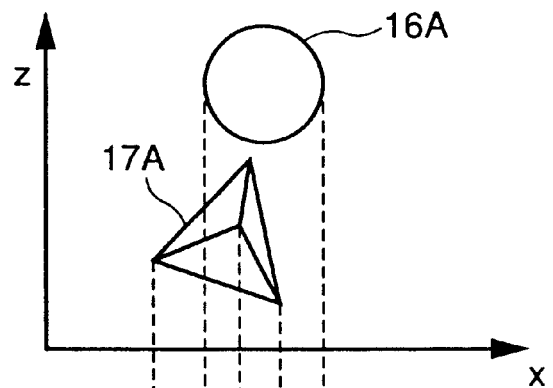
FIGS. 13A to 13C are conceptual diagrams shown for describing information to be stored in the frame buffer and the Z buffer.
Figure 13B:
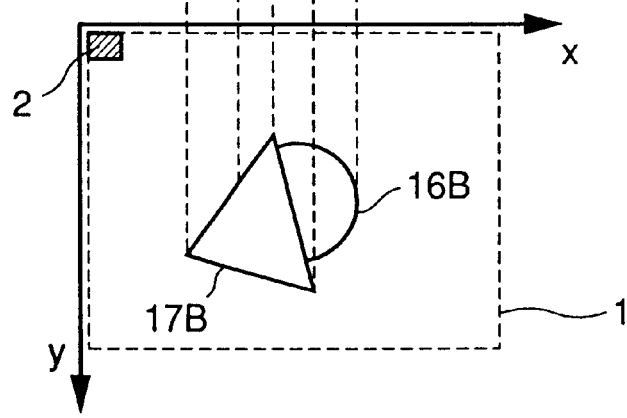
Figure 13C:
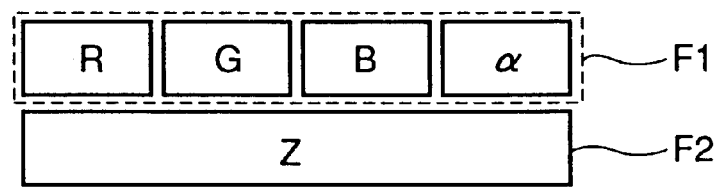

To show the operation of storage information deletion process unit 203 in the fifth embodiment of the present invention, FIGS. 13A to 13C are shown to describe a way to store a pixel 2 constituting screen 1 in the frame buffer and the Z buffer in the conventional three dimensional graphic accelerator.

FIG. 13A is a view of a spherical object 16 and a corn object 17 existing in a three dimensional space and seen from the top (x-z coordinates) showing the relation thereof. The character 16A corresponds to the spherical object and 17A corresponds to the corn object. In FIG. 13A, spherical object 16 is shown to be located behind corn object 17.

FIG. 13B is a view of spherical object 16 and corn object 17 existing in the three dimensional space and seen from the front (x-y coordinates) showing the relation thereof. The character 16B corresponds to spherical object 16 and 17B corresponds to corn object 17. In FIG. 13B, as spherical object 16 is located behind corn object 17, a part of object 16B can not be seen being concealed by object 17B.

In addition, as a vertex of corn object 17, which is a hidden surface, cannot be seen from the front (x-y coordinates), the vertex is not shown as an image.

Screen 1 for the display of these object is arranged as a matrix of pixel 2. In addition, pixel 2 is constituted of R/G/B color information, transparency information α, and depth information Z each represented by a plurality of bits.

FIG. 13C is a diagram showing storage content of the frame buffer and the Z buffer in the conventional graphic accelerator. In FIG. 13C, R/G/B color information and transparency information α constituting pixel 2 are stored in a specific region F1 in the frame buffer associated with a position of coordinate on the screen and depth information Z is stored in a specific region F2 in the Z buffer associated with the position of coordinate on the screen.

In the conventional scheme, as these data are written to and read out from the frame buffer and the Z buffer for each pixel constituting the screen, a large amount of image memory is required and the limitation of data transfer capability between the frame buffer, the Z buffer, and the three dimensional graphic accelerator becomes a bottleneck for the performance improvement.

Hence, the fifth embodiment of the present invention is made to solve this problem, and transparency information α and depth information Z of the object are shared by a group constituted of a plurality of pixels. Thus, the image memory capacity required for frame buffer 106 and Z buffer 206 is reduced and the amount of data to be transferred between graphic accelerator 200 and frame buffer 106 and Z buffer 206 is reduced, eliminating the bottleneck for performance improvement.

Figure 14:
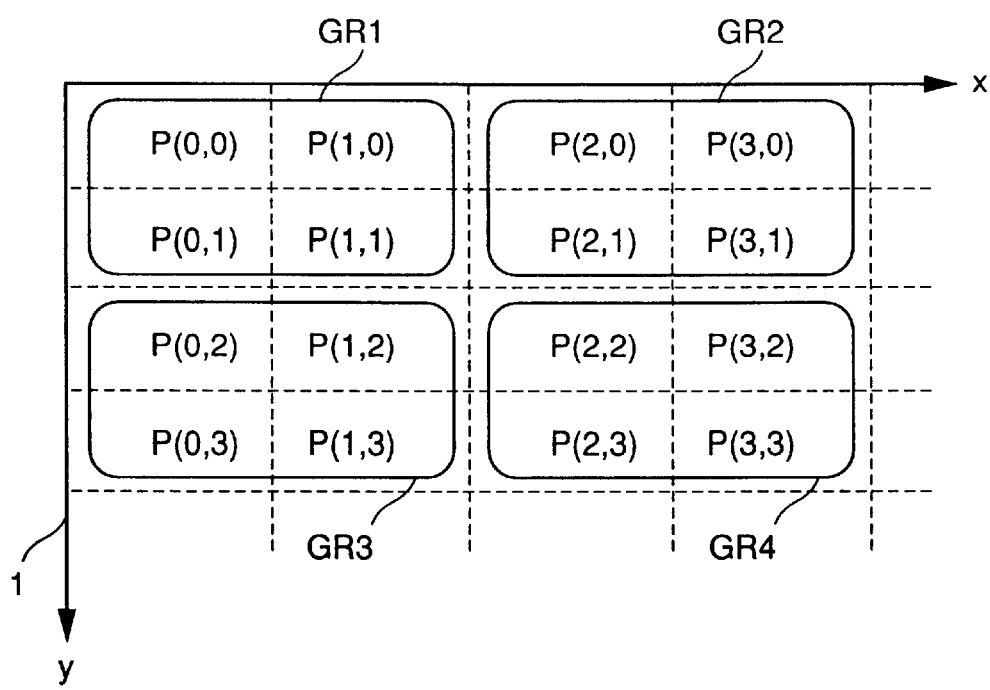
FIG. 14 is a conceptual diagram shown for describing a storing scheme according to the fifth embodiment of the present invention.

As shown in FIG. 14, the arrangement of pixels constituting screen 1 is divided into rectangular groups GR1, GR2, GR3 and GR4 each including the same number of plurality of pixels.

The size of each of groups GR1, GR2, GR3 and GR4 including the plurality of pixels is two pixels by two pixels in FIG. 14, but the size of the group (the number of pixels) is not limited thereto.

For example, pixels P (0, 0), P (1, 0), P (0, 1), and P (1, 1) belong to one group GR1 and pixels P (2, 0), P (3, 0), P (2, 1) and P (3, 1) belong to another group GR2.

Figure 15:
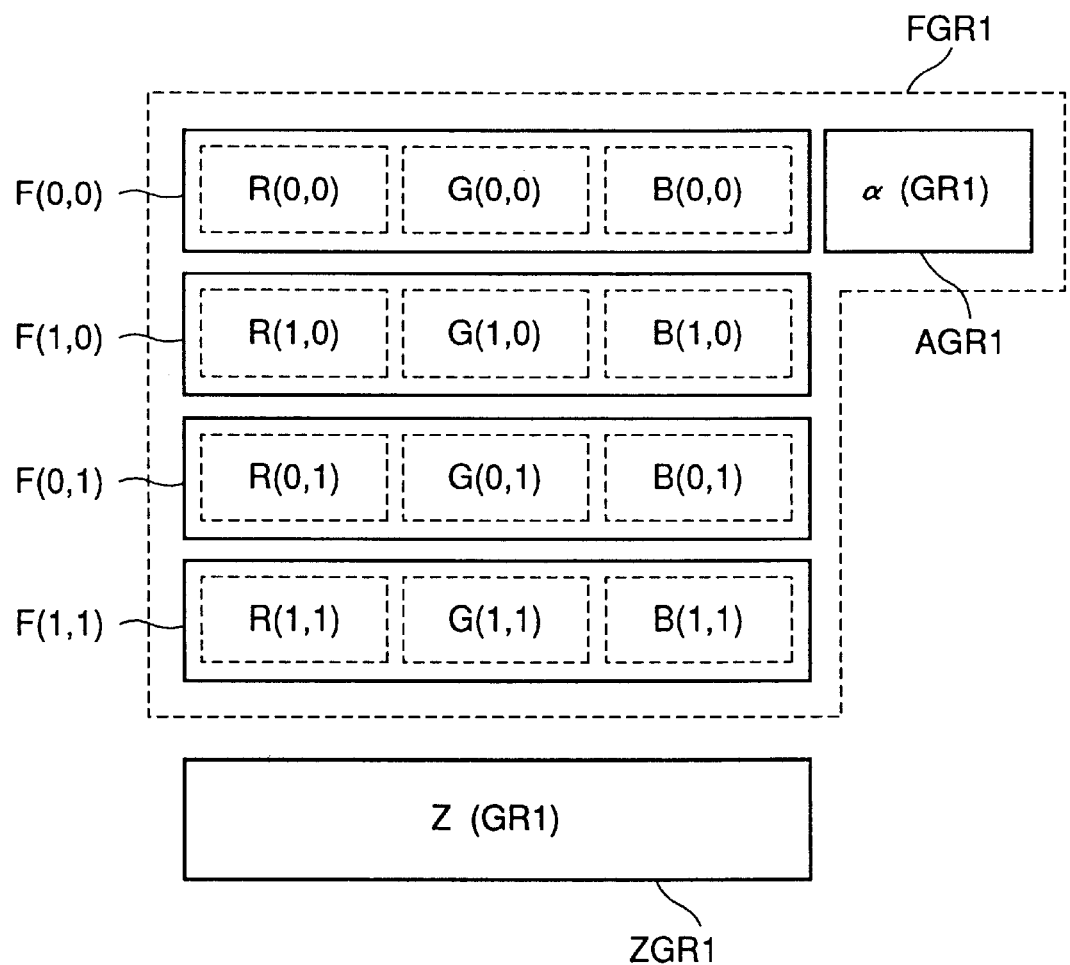
FIG. 15 is a conceptual diagram shown for describing information to be stored in frame buffer 106 and Z buffer 206 according to the fifth embodiment of the present invention.
Figure 16:
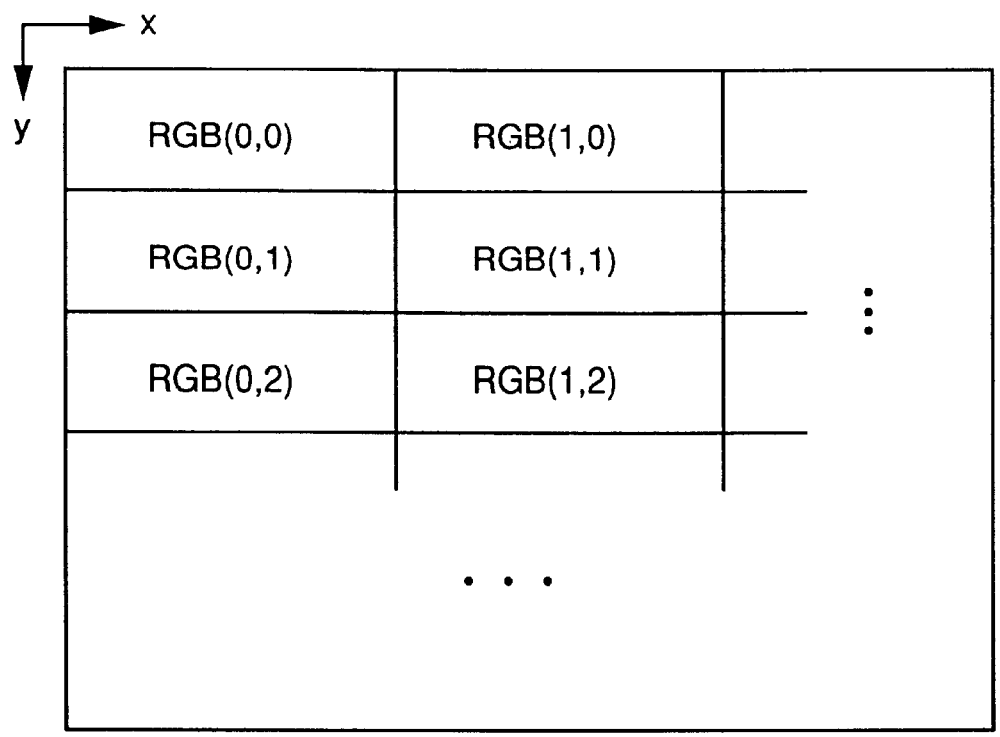
FIG. 16 is a conceptual diagram showing image information to be processed in the conventional two-dimensional graphic accelerator.

For the description of the operation of the fifth embodiment of the present invention, the storage content of frame buffer 106 and Z buffer 206 for pixels P (0, 0), P (1, 0), P (0, 1), and P (1, 1) constituting group GR1 is shown in FIG. 15.

In FIG. 15, FGR1 represents a specific region in frame buffer 106 constituted of a region F (0, 0) for storing R/G/B color information of pixel P (0, 0), a region F (1, 0) for storing R/G/B color information of pixel P (1, 0), a region F (0, 1) for storing R/G/B color information of pixel P (0, 1), a region F (1, 1) for storing R/G/B color information of pixel P (1, 1), and a region AGR1 for storing common transparency information α (GR1) for pixels that belong to group GR1.

ZGR1 represents a specific region in Z buffer 206 for storing common depth information Z (GR1) for pixels P (0, 0), P (1, 0), P (0, 1), P (1, 1) constituting group GR1.

A process of writing to frame buffer 106 and Z buffer 206 by storage information deletion process unit 203 according to the fifth embodiment of the present invention will be described hereinbelow.

As an example, a process will be described where transparency information α (0, 0) of pixel P (0, 0) is employed as common transparency information α (GR1) of group GR1 and depth information Z (0, 0) of pixel P (0, 0) is employed as common depth information Z (GR1) of group GR1.

With regard to pixel P (0, 0), common depth information Z (GR1) of group GR1 stored in region ZGR1 in Z buffer 206 is compared with depth information Z (0, 0) of a new pixel P (0, 0). When new pixel P (0, 0) is determined to be located in front of or at the same depth with the common depth as a result of comparison, R/G/B color information and transparency information are calculated based on R/G/B color information stored in storage region F (0, 0), common transparency information α (GR1) stored in storage region AGR1, R/G/B color information of new pixel P (0, 0) and transparency information α (0, 0) of new pixel P (0, 0), and information are written into region F (0, 0) and region AGR1 of frame buffer 106, respectively. Then, depth information Z (0, 0) of pixel P (0, 0) is written into region ZGR1 of Z buffer 206 as common depth information Z (GR1) of group GR1.

When new pixel P (0, 0) is determined to be located behind the common depth as a result of comparison between common depth information Z (GR1) stored in region ZGR1 of Z buffer 206 and depth information Z (0, 0) of new pixel P (0, 0), the process described above will not be performed and the values stored in region F (0, 0) of frame buffer 106 and AGR1, and the value stored in region ZGR1 of Z buffer 206 are maintained as they are.

With regard to pixel P (1, 0), comparison of common depth information Z (GR1) of group GR1 stored in Z buffer 206 and depth information Z (1, 0) of new pixel P (1, 0) will be performed. When new pixel P (1, 0) is determined to be located in front of or at the same depth with the common depth as a result of comparison, R/G/B color information is calculated based on R/G/B color information stored in storage region F (1, 0), common transparency information α (GR1) stored in storage region AGR1, R/G/B color information of new pixel P (1, 0) and transparency information α (1, 0) of new pixel P (1, 0), and the R/G/B color information is written into region F (1, 0) of frame buffer 106.

Here, common depth information Z (GR1) and common transparency information α (GR1) of group GR1 are not updated and the values in frame buffer 106 and Z buffer 206 are used as they are.

With regard to pixel P (0, 1), comparison of common depth information Z (GR1) of group GR1 stored in Z buffer 206 and depth information Z (0, 1) of new pixel P (0, 1) will be performed. When new pixel P (0, 1) is determined to be located in front of or at the same depth with the common depth as a result of comparison, R/G/B color information is calculated based on R/G/B color information stored in storage region F (0, 1), common transparency information α (GR1) stored in storage region AGR1, R/G/B color information of new pixel P (0, 1) and transparency information α (0, 1) of new pixel P (0, 1), and the R/G/B color information is written into region F (0, 1) of frame buffer 106.

Here, common depth information Z (GR1) and common transparency information α (GR1) of group GR1 are not updated and the values in frame buffer 106 and Z buffer 206 are used as they are.

With regard to pixel P (1, 1), comparison of common depth information Z (GR1) of group GR1 stored in Z buffer 206 and depth information Z (1, 1) of new pixel P (1, 1) will be performed. When new pixel P (1, 1) is determined to be located in front of or at the same depth with the common depth as a result of comparison, R/G/B color information is calculated based on R/G/B color information stored in storage region F (1, 1), common transparency information α (GR1) stored in storage region AGR1, R/G/B color information of new pixel P (1, 1) and transparency information α (1, 1) of new pixel P (1, 1), and the R/G/B color information is written into region F (1, 1) of frame buffer 106.

Here, common depth information Z (GR1) and common transparency information α (GR1) of group GR1 are not updated and the values in frame buffer 106 and Z buffer 206 are used as they are.

Thereafter the same process is performed on each of groups GR2, GR3, . . . and the hidden surface removal process employing the Z buffering method is performed for all pixels on the screen.

The described writing process for achieving the hidden line removal process with the Z buffering method is only an example and the other writing process can be employed as well.

For example, instead of depth information Z (0, 0) of pixel P (0, 0), depth information Z (1, 0) of pixel P (1, 0), depth information Z (0, 1) of pixel P (0, 1) or depth information Z (1, 1) of pixel P (1, 1) can be used as common depth information Z (GR1) of group GR1.

In addition, along with the hidden surface removal process, update process not shown in the above-described embodiments of depth information Z and transparency information α may be performed.

For example, as common transparency information α (GR1) for pixels in group GR1, transparency information α (0, 0) of pixel P (0, 0), transparency information α (0, 1) of pixel P (0, 1), transparency information α (1, 0) of pixel P (1, 0) and transparency information α (1, 1) of pixel P (1, 1) can be used. In addition, as common depth information Z (GR1) for pixels in group GR1, depth information Z (0, 0) of pixel P (0, 0), depth information Z (0, 1) of pixel P (0, 1), depth information Z (1, 0) of pixel P (1, 0), depth information Z (1, 1) of pixel P (1, 1) can be used. Next the process will be described.

With regard to pixel P (0, 0), common depth information Z (GR1) stored in Z buffer 206 is compared with depth information Z (0, 0) of pixel P (0, 0). When new pixel P (0, 0) is determined to be located in front of or at the same depth with the common depth as a result of comparison, R/G/B color information and transparency information are calculated based on R/G/B color information stored in storage region F (0, 0), common transparency information α (GR1) stored in storage region AGR1, R/G/B color information of new pixel P (0, 0) and transparency information α (0, 0) of new pixel P (0, 0), and these information are written into region F (0, 0) and region AGR1 in frame buffer 106. Then depth information Z (0, 0) of pixel P (0, 0) is written into region ZGR1 of Z buffer 206 as common depth information Z (GR1) of group GR1.

When new pixel P (0, 0) is determined to be located behind the common depth as a result of comparison between common depth information Z (GR1) stored in Z buffer 206 and depth information Z (0, 0) of new pixel P (0, 0), these processes are not performed and the values stored in region F (0, 0) and AGR1 in frame buffer 106, and the value stored in region ZGR1 in Z buffer 206 are maintained as they are.

With regard to pixel P (1, 0), common depth information Z (GR1) stored in Z buffer 206 is compared with depth information Z (1, 0) of pixel P (1, 0). When new pixel P (1, 0) is determined to be located in front of or at the same depth with the common depth as a result of comparison, R/G/B color information and transparency information are calculated based on R/G/B color information stored in storage region F (1, 0), common transparency information α (GR1) stored in storage region AGR1, R/G/B color information of new pixel P (1, 0) and transparency information α (1, 0) of new pixel P (1, 0), and these information are written into region F (1, 0) and region AGR1 in frame buffer 106. Then depth information Z (1, 0) of pixel P (1, 0) is written into region ZGR1 of Z buffer 206 as common depth information Z (GR1) of group GR1.

When new pixel P (1, 0) is determined to be located behind the common depth as a result of comparison between common depth information Z (GR1) stored in Z buffer 206 and depth information Z (1, 0) of new pixel P (1, 0), these processes are not performed and the values stored in region F (1, 0) and AGR1 in frame buffer 106, and the value stored in region ZGR1 in Z buffer 206 are maintained as they are.

With regard to pixel P (0, 1), common depth information Z (GR1) stored in Z buffer 206 is compared with depth information Z (0, 1) of pixel P (0, 1). When new pixel P (0, 1) is determined to be located in front of or at the same depth with the common depth as a result of comparison, R/G/B color information and transparency information are calculated based on R/G/B color information stored in storage region F (0, 1), common transparency information α (GR1) stored in storage region AGR1, R/G/B color information of new pixel P (0, 1) and transparency information α (0, 1) of new pixel P (0, 1), and these information are written into region F (0, 1) and region AGR1 in frame buffer 106. Then depth information Z (0, 1) of pixel P (0, 1) is written into region ZGR1 of Z buffer 206 as common depth information Z (GR1) of group GR1.

When new pixel P (0, 1) is determined to be located behind the common depth as a result of comparison between common depth information Z (GR1) stored in Z buffer 206 and depth information Z (0, 1) of new pixel P (0, 1), these processes are not performed and the values stored in region F (0, 1) and AGR1 in frame buffer 106, and the value stored in region ZGR1 in Z buffer 206 are maintained as they are.

With regard to pixel P (1, 1), common depth information Z (GR1) stored in Z buffer 206 is compared with depth information Z (1, 1) of pixel P (1, 1). When new pixel P (1, 1) is determined to be located in front of or at the same depth with the common depth as a result of comparison, R/G/B color information and transparency information are calculated based on R/G/B color information stored in storage region F (1, 1), common transparency information α (GR1) stored in storage region AGR1, R/G/B color information of new pixel P (1, 1) and transparency information α (1, 1) of new pixel P (1, 1), and these information are written into region F (1, 1) and region AGR1 in frame buffer 106. Then depth information Z (1, 1) of pixel P (1, 1) is written into region ZGR1 of Z buffer 206 as common depth information Z (GR1) of group GR1.

When new pixel P (1, 1) is determined to be located behind the common depth as a result of comparison between common depth information Z (GR1) stored in Z buffer 206 and depth information Z (1, 1) of new pixel P (1, 1), these processes are not performed and the values stored in region F (1, 1) and AGR1 in frame buffer 106, and the value stored in region ZGR1 in Z buffer 206 are maintained as they are.

Thereafter the same process is applied to each of groups GR2, GR3, . . . , and the hidden surface removal process employing the Z buffering method is performed for all pixels on the screen.

Here, it is not preferable to use an average value of depth information Z of a plurality of pixels as common depth information Z (GR1) of group GR1.

This is because each group which is a unit of pixel division are not always included in the polygon. For example, assume that an average value of depth information Z (0, 0) and Z (1, 1) is used for the calculation of common depth information Z (GR1). If the coordinate of a vertex of the polygon falls on pixel P (1, 1), the latest depth information on pixel P (0, 0) is required to find an average of depth information Z, which procedure is necessary basically when position of the vertex of the polygon is not known.

Next, a way to read data from frame buffer 106 and Z buffer 206 and a process in screen data generation unit 205 according to the fifth embodiment will be described.

Screen data generation unit 205 reads pixel data corresponding to one scan line from frame buffer 106 through screen memory control unit 204.

Assume that the number of pixels in the direction of x in the screen is n. When the pixel data constituting the first scan line in the screen is to be read, R/G/B color information of pixels P (0, 0), P (1, 0), P (2, 0), . . . , P (n–1, 0) stored in frame buffer 106 are read out, and common transparency information α (GR1) stored in region FGR1, . . . , and common depth information Z (GR1) stored in region ZGR1, . . . are not read out.

It is because these values include intermediate data used for generating screen image shown in two dimension.

Through the process described above, the amount of data to be transferred between frame buffer 106 and Z buffer 206 and image memory control unit 204, or graphic accelerator 200 can be reduced. Hence, still faster data processing can be achieved.

In this example, R/G/B color information is stored for all pixels. Yet further reduction of pixel memory capacity is allowed through the sharing of R/G/B color information in the rectangular group as shown in first to fourth embodiments.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A graphic accelerator generating display data based on data stored in an image memory, the graphic accelerator including:

a storage control unit configured for receiving a plurality of pixels each having three types of color information including first type color information, second type color information and third type color information, deleting one of said three types of color information and storing color information of said plurality of pixels in said image memory such that said plurality of pixels include a first pixel having two types of color information excluding the first type color information and a second pixel having two type of color information excluding the second type color information; and an interpolation process unit configured for restoring said plurality of pixels by interpolating the color information of said first pixel with the first type color information of said second pixel and interpolating the color information of said second pixel with the second type color information of said first pixel; said graphic accelerator supplying said display data as an output according to the plurality of pixels stored in said image memory and interpolation result of said interpolation process unit.

2. The graphic accelerator according to claim 1, wherein said storage control unit stores the two types of color information of said first pixel in said image memory for each of the plurality of pixels arranged in a direction of even scan lines, and stores the two types of color information of said second pixel in said image memory for each of the plurality of pixels arranged in a direction of odd scan lines.

3. The graphic accelerator according to claim 1, wherein said storage control unit stores the two types of color information of said first pixel in said image memory for each of a first plurality of pixels arranged as a matrix and included in said plurality of pixels, and stores the two types of color information of said second pixel in said image memory for each of a remaining second plurality of pixels included in said plurality of pixels.

4. The graphic accelerator according to claim 1, wherein said storage control unit divides said plurality of pixels into a plurality of blocks, and deletes color information so that said plurality of blocks each include said first pixel and said second pixel, and said interpolation process unit interpolates the color information of said first pixel with the first type color information of said second pixel of the same block as said first pixel and interpolates the color information of said second pixel with the second type color information of said first pixel of the same block as said second pixel.

5. The graphic accelerator according to claim 1, wherein said storage control unit deletes color information such that said plurality of pixels to be output include said first pixel, said second pixel, and a third pixel having two types of color information excluding the third type color information.

6. The graphic accelerator according to claim 5, wherein said plurality of pixels are arranged in said image memory such that a first line in which all pixels arranged in the scan direction of the screen are said first pixels, a second line which is next to said first line and in which all pixels arranged in the scan direction of the screen are said second pixels, and a third line which is next to said second line and in which all pixels arranged in the scan direction of the screen are said third pixels are repeatedly arranged.

7. The graphic accelerator according to claim 1, wherein each of said plurality of pixels written into said image memory includes the third type color information.

8. The graphic accelerator according to claim 7, wherein each of said plurality of pixels written into said image memory includes green color information.

9. A graphic accelerator generating display data based on data stored in an image memory, the graphic accelerator including:

a storage control unit configured for receiving a plurality of pixels each having color information and depth value information, and dividing said plurality of pixels into a plurality of blocks, said storage control unit further configured, on each block basis, for deriving a common depth value from the pixels of said block, storing the common depth value in said image memory, comparing a depth value of each pixel of the block with the common depth value stored in said image memory, and updating color information of the pixel to store the resulting information in said image memory according to a hidden surface removal process; and a circuit configured for supplying said display data as an output employing the plurality of pixels stored in said image memory.

10. The graphic accelerator according to claim 9, wherein each of said plurality of pixels to be supplied as an input further includes transparency value information, and said storage control unit derives a common transparency value for each block and stores the common transparency values in said image memory, performs an alpha blending process based on the common transparency values and stores the resulting information in said image memory.

11. The graphic accelerator according to claim 10, wherein said image memory includes, a Z buffer for storing said common depth values derived from said respective blocks and, a frame buffer for storing color information of each of said plurality of pixels and the common transparency information for each block.

* * * * *